United States Patent
Sarraf et al.

(10) Patent No.: US 6,445,693 B1
(45) Date of Patent: Sep. 3, 2002

(54) METHOD AND APPARATUS FOR ESTIMATING POWER OF FIRST ADJACENT ANALOG FM INTERFERENCE IN AN IN-BAND ON-CHANNEL (IBOC) COMMUNICATION SYSTEM

(75) Inventors: Mohsen Sarraf, Rumson; Mohammad Hossein Zarrabizadeh, Woodbridge, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,011

(22) Filed: Sep. 15, 1999

(51) Int. Cl.[7] .................................................. H04J 1/00
(52) U.S. Cl. ........................ 370/343; 370/344; 375/227
(58) Field of Search ................................ 370/343, 344, 370/208, 529; 375/260, 227, 340, 130; 455/134, 135

(56) References Cited

U.S. PATENT DOCUMENTS 5,949,796 A  * 9/1999 Kumar ........................ 370/529
6,108,810 A  * 8/2000 Kroeger et al. ............. 714/790

* cited by examiner

Primary Examiner—Edward F. Urban
Assistant Examiner—Erika A. Gary
(74) Attorney, Agent, or Firm—Ryan, Mason & Lewis, LLP

(57) ABSTRACT

A method and apparatus are disclosed for estimating the power of the first adjacent FM interference and for using the estimated power to identify the number of OFDM bins that are at least partially corrupted by the first adjacent FM interference. The number of corrupted bins, $N_{corr}$, is obtained based on measurements of the power of each of the first adjacent FM analog interference, $I_k$, and the power of the background noise, $N_k$, of the digital side bands. The power measurements, together with the known slope of the first adjacent FM analog interference, is used to identify when the power of the measured background level equals the prorated power of the slope. All of the bins that fall below a threshold value are determined to be at least partially corrupted. The FFT output provides the power of the first adjacent FM analog interference, $I_k$, measured, for example, at ±200 kHz, and the power of the background noise, $N_k$, of each of the digital side bands, measured, for example, at 130 kHz and −130 kHz. In a hard-masking implementation, the corrupted bins are discarded (set to zero) and in a soft-masking implementation, the partially corrupted bins are scaled according to the interference slope before further processing, for example, by the Viterbi decoder.

21 Claims, 5 Drawing Sheets

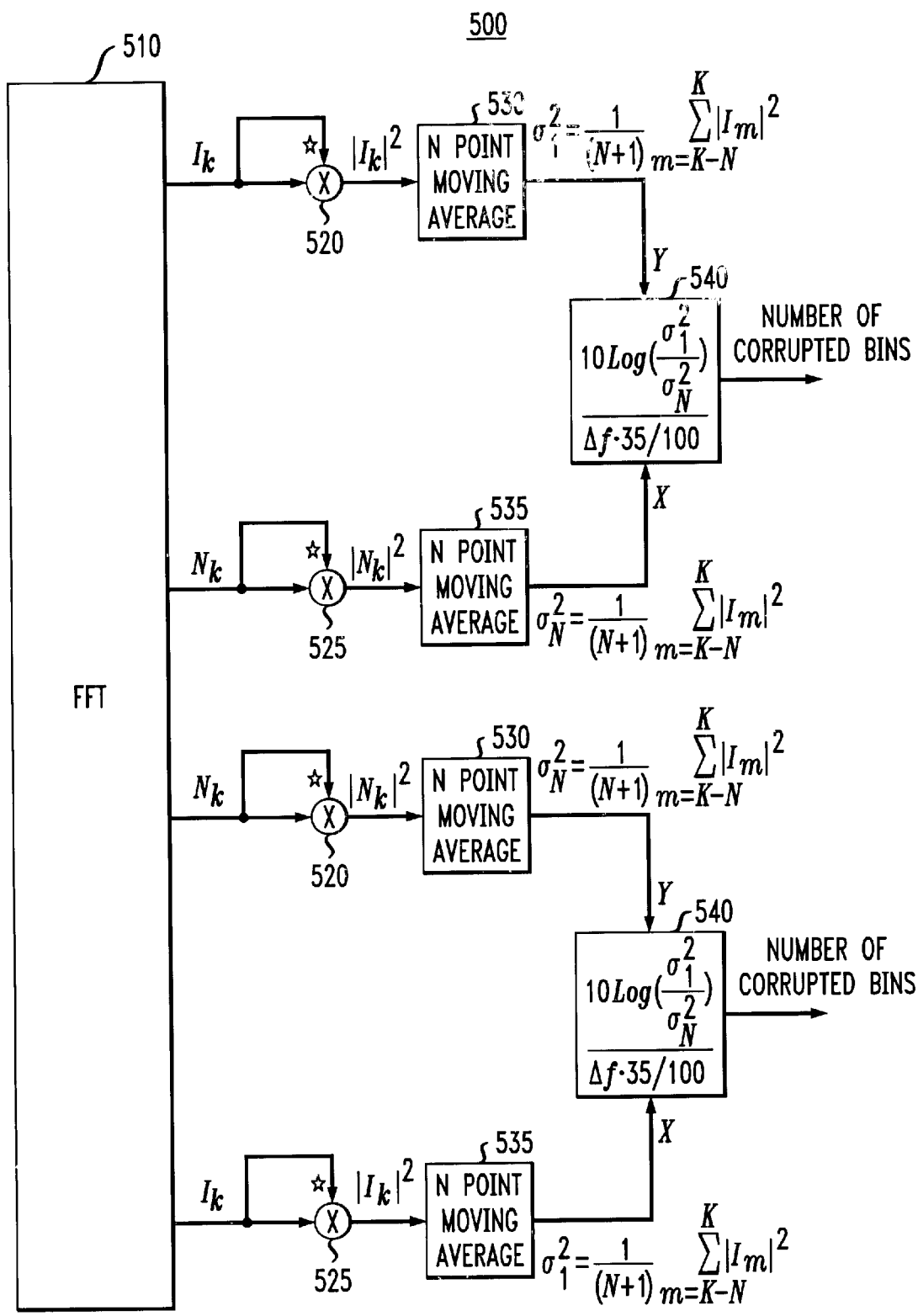

METHOD AND APPARATUS FOR ESTIMATING POWER OF FIRST ADJACENT ANALOG FM INTERFERENCE IN AN IN-BAND ON-CHANNEL (IBOC) COMMUNICATION SYSTEM

FIELD OF THE INVENTION

The present invention relates generally to digital audio broadcasting (DAB) and other types of digital communication systems, and more particularly, to techniques for estimating the power of first adjacent analog FM interference in such digital audio broadcasting and other types of digital communication systems.

BACKGROUND OF THE INVENTION

Proposed systems for providing digital audio broadcasting in the FM radio band are expected to provide near CD-quality audio, data services and more robust coverage than existing analog FM transmissions. However, until such time as a transition to all-digital DAB can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

In order to prevent significant distortion in conventional analog FM receivers, the digital signal in a typical FM HIBOC DAB system is, for example, transmitted in two side bands, one on either side of the analog FM host signal, using orthogonal frequency division multiplexing (OFDM) sub-carriers. In an OFDM communication system, the digital signal is modulated to a plurality of small sub-carrier frequencies that are then transmitted in parallel.

In the United States, the frequency plan established by current FCC regulations separates each transmitting station in a geographical area by 800 KHz. Any transmitting stations in adjacent geographical areas, however, are separated from a local transmitting stations by only 200 KHz. Thus, a particularly significant source of interference in such a system is known as first adjacent analog FM interference. This interference results when a portion of a FM host carrier in an adjacent geographic area overlaps in frequency with a portion of a digital signal side band. Although first adjacent analog FM interference, when present, typically affects only one of the two digital side bands, it nonetheless represents a limiting factor on the performance of DAB systems. The presence of a strong first adjacent interference signal will significantly degrade the performance of the digital signal transmissions, even when one of the two side bands is free from interference.

The most challenging task for each IBOC receiver is to handle the interference from the analog first adjacent to the digital signal at the edge of the coverage zone. The power of the first analog FM interference can exceed the DAB signal by a margin of 19 dB at the edge of the coverage. The bins that are highly corrupted by the first adjacent analog FM interference can produce false metrics in the Viterbi decoder algorithm and as such substantially degrade the performance of the soft decoder. As far as the synchronization algorithm is concerned, the first adjacent analog FM interference is the dominant factor in the compound signal (DAB plus FM analog) in the time domain. Since the signal in the time domain is processed for the purpose of frame acquisition, the algorithm will fail as a result of the high power analog FM component. In any case, the receiver must know the power levels of the upper and lower first adjacent interferences in order to cope with the synchronization failure as well as high bit error rate (BER).

A need therefore exists for a method and apparatus for estimating the power of the first adjacent FM analog interference. A further need exists for a method and apparatus that estimate the number of OFDM bins that are corrupted by the first adjacent FM interference.

SUMMARY OF THE INVENTION

Generally, a method and apparatus are disclosed for estimating the power of the first adjacent FM interference and for using the estimated power to identify the number of OFDM bins that are at least partially corrupted by the first adjacent FM interference. The number of corrupted bins, $N_{corr}$, is obtained based on measurements of the power of each of the first adjacent FM analog interference, $I_k$, and the power of the background noise, $N_k$, of the digital side bands. The power measurements, together with the known slope of the analog signal, is used to identify when the power of the measured background level equals the prorated power of the slope. All of the bins that fall below a threshold value are determined to be at least partially corrupted.

According to one aspect of the invention, the FFT output provides the power of the first adjacent FM analog interference, $I_k$, measured, for example, at ±200 kHz, and the power of the background noise, $N_k$, of each of the digital side bands, measured, for example, at 130 kHz and −130 kHz. The receiver includes blocks for using the measured power values and the known slope of the first adjacent FM interference to determine the number of corrupted bins, $N_{corr}$, in accordance with the following equation:

$$N_{corr} = \frac{10 \log\left(\frac{\sigma_I^2}{\sigma_N^2}\right)}{\Delta f \cdot 35/100}, \quad (1)$$

where $$\sigma_I^2 = \frac{1}{N+1} \sum_{m=K-N}^{K} |I_m|^2, \text{ and} \quad (2)$$

$$\sigma_N^2 = \frac{1}{N+1} \sum_{m=K-N}^{K} |N_m|^2. \quad (3)$$

In a hard-masking implementation, the corrupted bins are discarded (set to zero) and in a soft-masking implementation, the partially corrupted bins are scaled according to the interference slope before further processing, for example, by the Viterbi decoder.

A more complete understanding of the present invention, as well as further features and advantages of the present invention, will be obtained by reference to the following detailed description and drawings.

BRIEF DESCRIPTION OF THE DRAWINGS

FIG. 5 illustrates a system for determining the number of corrupted bins, $N_{corr}$, in accordance with the present invention.

DETAILED DESCRIPTION

The present invention estimates the number of corrupted bins, $N_{corr}$, due to the first adjacent FM interference based on measurements of the power of each of the first adjacent FM analog interference, $I_k$, and the power of the background noise, $N_k$, of the digital side bands 102, 104. The power measurements, together with the known slope of the FM analog signal. spectrum, is used to determine the number of corrupted bins on each side. The number of corrupted bins, $N_{corr}$, are obtained by identifying when the power of the measured background level equals the prorated power of the slope.

Figure 1:
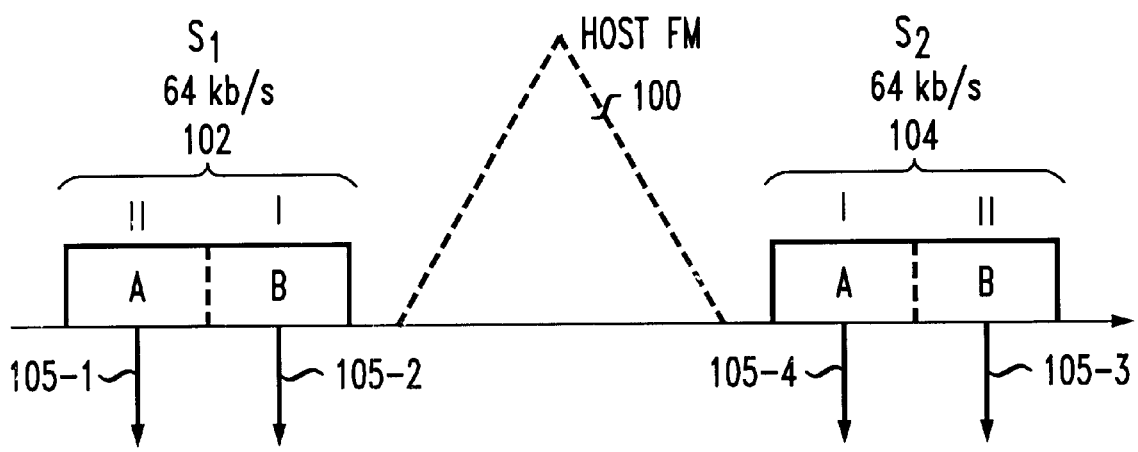
FIG. 1 shows a portion of a frequency spectrum in an exemplary hybrid in-band on-channel digital audio broadcasting system in accordance with the present invention.

FIG. 1 illustrates a portion of a frequency spectrum in an exemplary FM HIBOC DAB system, plotted with the power, P, as a function of frequency, $f$. The portion of the spectrum shown in FIG. 1 includes an analog host FM signal 100 with associated lower digital side band 102 and upper digital side band 104. The side bands represent portions of the frequency spectrum used to transmit digital.audio information in the HIBOC DAB system.

In the exemplary FM HIBOC DAB system of FIG. 1, an audio signal is first encoded using a multi-descriptive. coding technique to produce two streams $S_1$ and $S_2$. The streams $S_1$ and $S_2$ are transmitted on host FM signal 100 as side-bands 102 and 104, respectively. The transmission of multi-descriptive streams $S_1$ and $S_2$ in different frequency bands provides both time and frequency diversity.

The two streams $S_1$ and $S_2$ are then divided into two classes, class I (core) and class II (enhancement), using a bit stream classifier. Class I bits represent the more important audio bits, and may be provided with a higher level of error protection, for example, by associating them with innermost sub-bands B, C, i.e., the sub-bands which are less susceptible to first adjacent channel interference. Class II bits, which have been determined to be of lesser importance to reconstructed audio quality than the class I bits, are provided with a lower level of error protection, for example, by associating them with innermost sub-band A, D, i.e., the sub-bands which are more susceptible to first adjacent channel interference. Performance gains are obtained from this type of error protection by exploiting interference variations across the side bands. Other error protection techniques, such as providing a higher transmission power for sub-bands B and C than for sub-bands A and D may also be used.

The system in the illustrative embodiment, discussed further below, uses an inner cyclic redundancy code (CRC), and differential quadrature phase shift keyed (DQPSK)/OFDM modulation. The DQPSK modulation of transmitted symbols provides robustness to frequency-selective fading and oscillator phase drift. The differential encoding is performed in frequency between OFDM tones. The digital signal to be transmitted and the outer CRC block code to be transmitted in each of the side bands 102, 104 are different classes of the PAC encoder and are transmitted in such a manner that each side band 102, 104 can be decoded independent of the other side. As shown in FIG. 1, each of the side bands include N components, 102-1 through 102-N, and 104-1 through 104-N, respectively. The components may represent, for example, sets of orthogonal frequency division multiplexed (OFDM) sub-carriers. Pilot tones 103 are present at either end of the side band 102, and pilot tones 105 are present at either end of the side band 104. Additional pilot tones (not shown) may be present elsewhere in the portion of the frequency spectrum shown. The pilot tones 103, 105 correspond to selected OFDM reference tones, and may be used to determine the presence of interference. While the unmodulated pilot tones 103, 105 could be placed anywhere across the DAB spectrum (or eliminated entirely), the main advantage of positioning them on the side is to utilize them as reference points in the DQPSK de-modulation across the frequency domain.

Figure 2:
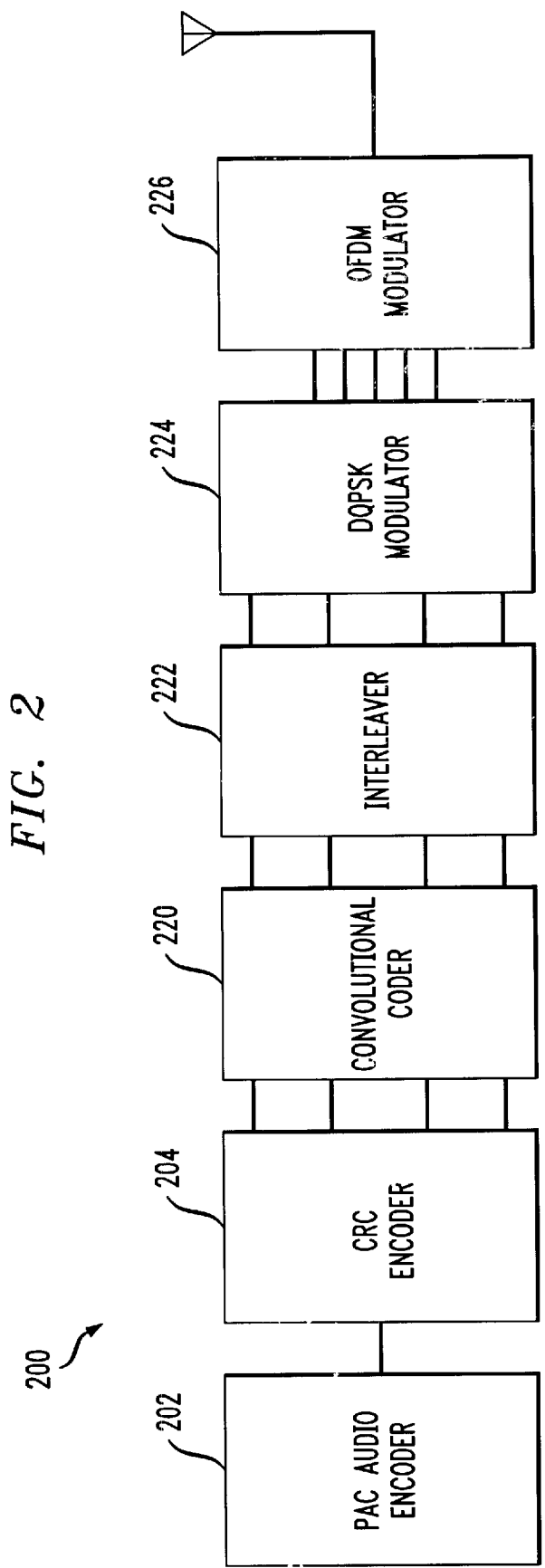
FIG. 2 is a schematic block diagram of a transmitter in an exemplary hybrid in-band on-channel digital audio broadcasting system in which the present invention may be implemented.

FIG. 2 shows a transmitter 200 of an exemplary FM HIBOC DAB system in which the invention may be implemented. It should be noted that FIG. 2 shows only the digital portion of the system, i.e., the portions associated with generation and processing of the digital signals. Additional conventional processing elements may be used to process the analog signals. A PAC audio coder 202 generates an encoded audio signal, for example, at a bit rate of 96 kbps using the audio compression techniques described, for example, in D. Sinha, J. D. Johnston, S. Dorward and S. R. Quackenbush, "The Perceptual Audio Coder," in Digital Audio, Section 42, pp. 42-1 to 42-18, CRC Press, 1998, incorporated by reference herein. For a more detailed discussion of a conventional orthogonal frequency division multiplexing system, see, for example, W. Y. Zou and Y. Wu, "COFDM—An Overview," IEEE Trans. Broadcasting, Vol. 41, No. 1, 1–8 (March 1995) or J. A. C. Bingham, "Multicarrier Modulation for Data Transmission: An Idea Whose Time Has Come," IEEE Comm., 5–14 (May 1990), each incorporated by reference herein.

The encoded audio bit stream is applied to a CRC encoder 204, which generates CRC bits in a conventional manner using a CRC error detecting block code. CRC is an example of one type of "outer code" that may be used in the system 200. Other possible outer codes include, for example, Reed-Solomon (RS) codes, Bose-Chadhuri-Hocquenghem (BCH) codes, and other block codes.

As shown in FIG. 2, the FM HIBOC DAB system 200 also includes a convolutional coder 220, such as a complementary punctured pair convolutional (CPPC) coder for coding the audio bitstream in accordance with well-known CPPC techniques. In addition, the FM HIBOC DAB system 200 includes an interleaver 222, a DQPSK modulator 224, and an OFDM modulator 226. The convolutional coding in coder 220 is an example of a type of "inner code" that may be used in the system 200. Other types of inner codes may also be used, including block or convolutional codes, so-called "turbo" codes, and coding associated with trellis coded modulation. The modulated output of the OFDM modulator 226, which corresponds to the digital side bands 102 and 104, is transmitted through an FM broadcast channel 230 to a receiver (not shown). The DQPSK modulator 224 processes the interleaved bit stream to generate two bits for each QPSK symbol, which are then mapped to the appropriate sub-carrier by the OFDM modulator 226.

Figure 3:
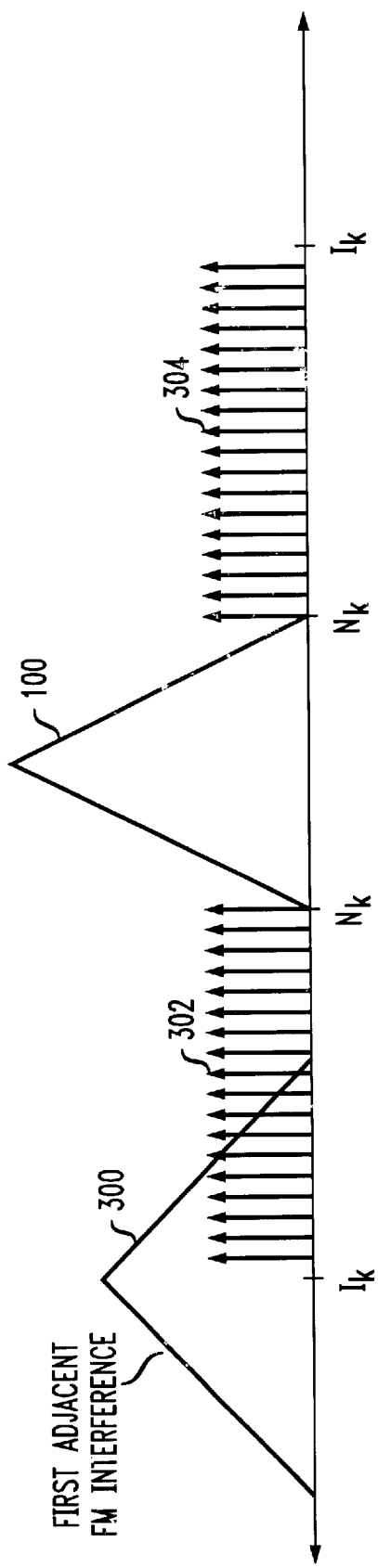
FIG. 3 illustrates the format of an OFDM frame in accordance with the present invention.

FIG. 3 illustrates a portion of a frequency spectrum in an exemplary FM HIBOC DAB system, plotted with the power, P, as a function of frequency, $f$, in the presence of first adjacent FM interference. The portion of the spectrum shown in FIG. 1 includes an analog host FM signal 100 and a first adjacent FM interference 300. In addition, FIG. 3 shows two sets of orthogonal frequency division multiplexed sub-carriers 302, 304.

Figure 4:
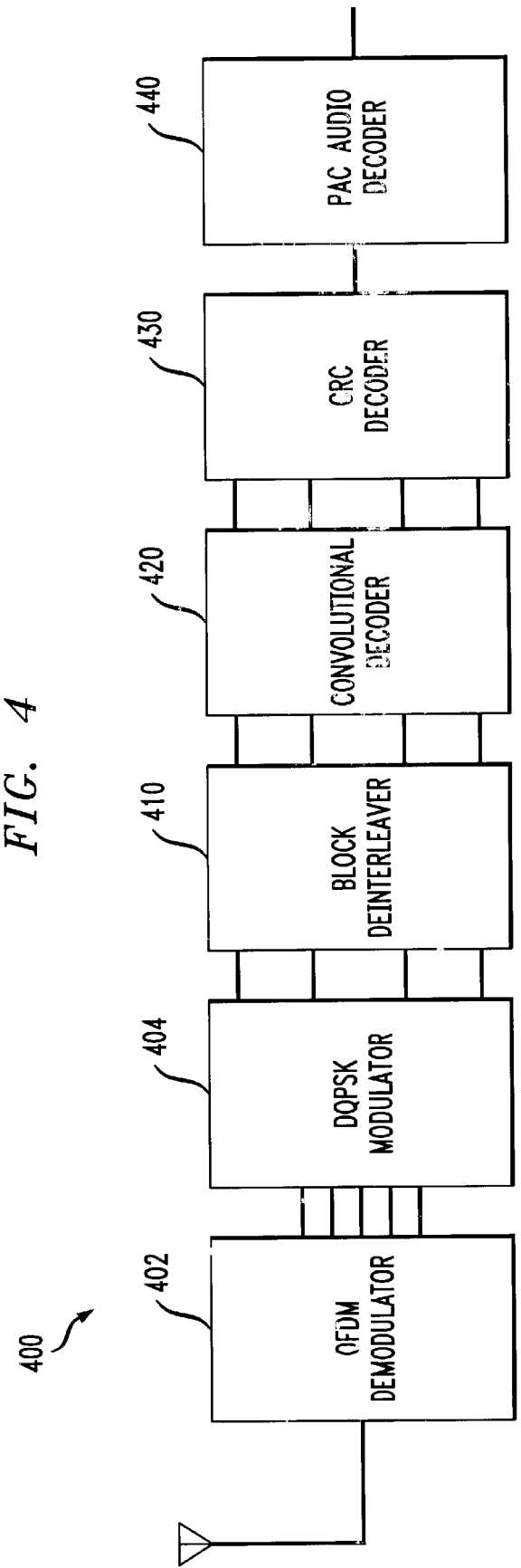
FIG. 4 is a schematic block diagram of an exemplary receiver in a hybrid in-band on-channel digital audio broadcasting system in which the present invention may be implemented.

FIG. 4 shows an exemplary receiver 400 in an FM HIBOC DAB system in which the invention may be implemented. The receiver 400 contains elements 402, 404, 410, 420, 430, 440 that perform the inverse function of the corresponding element in the transmitter 200, in a manner well-known to those skilled in the art.

According to one feature of the present invention, the power of the first adjacent FM analog interference, $I_k$, is initially measured, for example, at ±200 kHz. In addition, the power of the background noise, $N_k$, of the digital side bands 102, 104, are measured, for example, at 130 kHz and −130 kHz. In addition, the slope of the analog signal spectrum is known to be 35 dB/100 kHz. Thus, the present invention can determine the number of corrupted bins on each side, by identifying when the power of the measured background level, $N_k$, equals the prorated power of the slope.

The number of corrupted bins, $N_{corr}$, is obtained as follows:

$$N_{corr} = \frac{10 \log\left(\frac{\sigma_I^2}{\sigma_N^2}\right)}{\Delta f \cdot 35/100}, \quad (1)$$

where $$\sigma_I^2 = \frac{1}{N+1} \sum_{m=K-N}^{K} |I_m|^2, \text{ and} \quad (2)$$

$$\sigma_N^2 = \frac{1}{N+1} \sum_{m=K-N}^{K} |N_m|^2. \quad (3)$$

FIG. 5 illustrates a system 500 for determining the number of corrupted bins, $N_{corr}$. As shown in FIG. 5, the output of the FFT 510 provides the power of the first adjacent FM analog interference, $I_k$, measured, for example, at ±200 kHz, and the power of the background noise, $N_k$, of the digital side bands 102, 104, measured, for example, at 130 kHz and −130 kHz. It is noted that the measurements are performed in the illustrative embodiment at ±130 kHz and ±200 kHz because only the background noise and the first adjacent interference signal are available at such frequencies. A set of multipliers 520, 525 multiplies the corresponding power measurement, $I_k$ or $N_k$, by the corresponding conjugate value to obtain the square of the absolute value. An N point moving average is then obtained using blocks 530, 535, to implement equations (2) and (3), above. Finally, the number of corrupted bins, $N_{corr}$, is determined at stage 540, using equation (1), above.

In a hard-masking implementation, the bins with SNR degradation less than 3 dB due to the first adjacent are maintained and the bins with more than 3 dB degradation are discarded (set to zero). In a soft-masking implementation, the partially corrupted bins are scaled according to interference slope before processing by the Viterbi decoder. In this manner, less weight is applied in the Viterbi decoder, where most of the decision is based on the larger value bits.

It is to be understood that the embodiments and variations shown and described herein are merely illustrative of the principles of this invention and that various modifications may be implemented by those skilled in the art without departing from the scope and spirit of the invention.

We claim:

1. A method for estimating the number of bins in an orthogonal frequency division multiplexing digital audio broadcasting system having at least one digital side band that are at least partially corrupted by first adjacent FM interference, said method comprising the steps of:

measuring the power, $I_k$, of a peak of said first adjacent FM analog interference;

measuring the power of the background noise, $N_k$, of said digital side band; and identifying said at least partially corrupted bins by determining a point at which said measured background power equals the estimated power of said first adjacent FM analog interference.

2. The method of claim 1, wherein said estimated power of said first adjacent FM analog interference is obtained based on said measured power, $I_k$, of a peak of said first adjacent FM analog interference and a known slope of said first adjacent FM analog interference.

3. The method of claim 1, wherein said power, $I_k$, of a peak of said first adjacent FM analog interference is measured at a center frequency of a transmitting station in an adjacent geographical area.

4. The method of claim 1, wherein said power of the background noise, $N_k$, of said digital side band is measured approximately adjacent to an analog host signal.

5. The method of claim 1, wherein said identifying step determines the number of corrupted bins, $N_{corr}$, in accordance with the following equation:

$$N_{corr} = \frac{10 \log\left(\frac{\sigma_I^2}{\sigma_N^2}\right)}{\Delta f \cdot 35/100}, \quad (1)$$

where $$\sigma_I^2 = \frac{1}{N+1} \sum_{m=K-N}^{K} |I_m|^2, \text{ and} \quad (2)$$

$$\sigma_N^2 = \frac{1}{N+1} \sum_{m=K-N}^{K} |N_m|^2. \quad (3)$$

6. The method of claim 1, further comprising the step of setting said identified at least partially corrupted bins to zero.

7. The method of claim 1, further comprising the step of scaling said identified at least partially corrupted bins according to said slope of said first adjacent FM interference.

8. A system for estimating the number of bins in an orthogonal frequency division multiplexing digital audio broadcasting system having at least one digital side band that are at least partially corrupted by first adjacent FM interference, said system comprising:

a power estimator for measuring the power, $I_k$, of a peak of said first adjacent FM analog interference;

a power estimator for measuring the power of the background noise, $N_k$, of said digital side band; and means for identifying said at least partially corrupted bins by determining a point at which said measured background power equals the estimated power of said first adjacent FM analog interference.

9. The system of claim 8, wherein said estimated power of said first adjacent FM analog interference is obtained based on said measured power, $I_k$, of a peak of said first adjacent FM analog interference and a known slope of said first adjacent FM analog interference.

10. The system of claim 8, wherein said power, $I_k$, of a peak of said first adjacent FM analog interference is measured at a center frequency of a transmitting station in an adjacent geographical area.

11. The system of claim 8, wherein said power of the background noise, $N_k$, of said digital side band is measured approximately adjacent to an analog host signal.

12. The system of claim 8, wherein said means for identifying determines the number of corrupted bins, $N_{corr}$, in accordance with the following equation:

$$N_{corr} = \frac{10 \log\left(\frac{\sigma_I^2}{\sigma_N^2}\right)}{\Delta f \cdot 35/100}, \quad (1)$$

where $$\sigma_I^2 = \frac{1}{N+1} \sum_{m=K-N}^{K} |I_m|^2, \text{ and} \quad (2)$$

$$\sigma_N^2 = \frac{1}{N+1} \sum_{m=K-N}^{K} |N_m|^2. \quad (3)$$

13. The system of claim 8, further comprising means for setting said identified at least partially corrupted bins to zero.

14. The system of claim 8, further comprising means for scaling said identified at least partially corrupted bins according to said slope of said first adjacent FM interference.

15. A system for estimating the number of bins in an orthogonal frequency division multiplexing digital audio broadcasting system having at least one digital side band that are at least partially corrupted by first adjacent FM inferference, said system comprising:

means for measuring the power, $I_k$, of a peak of said first adjacent FM analog interference;

means for measuring the power of the background noise, $N_k$, of said digital side band; and means for identifying said at least partially corrupted bins by determining a point at which said measured background power equals the estimated power of said first adjacent FM analog interference.

16. The system of claim 15, wherein said estimated power of said first adjacent FM analog interference is obtained based on said measured power, $I_k$, of a peak of said first adjacent FM analog interference and a known slope of said first adjacent FM analog interference.

17. The system of claim 15, wherein said power, $I_k$, of a peak of said first adjacent FM analog interference is measured at a center frequency of a transmitting station in an adjacent geographical area.

18. The system of claim 15, wherein said power of the background noise, $N_k$, of said digital side band is measured approximately adjacent to an analog host signal.

19. The system of claim 15, wherein said means for identifying determines the number of corrupted bins, $N_{corr}$, in accordance with the following equation:

$$N_{corr} = \frac{10 \log\left(\frac{\sigma_I^2}{\sigma_N^2}\right)}{\Delta f \cdot 35/100}, \quad (1)$$

where $$\sigma_I^2 = \frac{1}{N+1} \sum_{m=K-N}^{K} |I_m|^2, \text{ and} \quad (2)$$

$$\sigma_N^2 = \frac{1}{N+1} \sum_{m=K-N}^{K} |N_m|^2. \quad (3)$$

20. The system of claim 15, further comprising means for setting said identified at least partially corrupted bins to zero.

21. The system of claim 15, further comprising means for scaling said identified at least partially corrupted bins according to said slope of said first adjacent FM interference.

* * * * *